Patented Jan. 2, 1923.

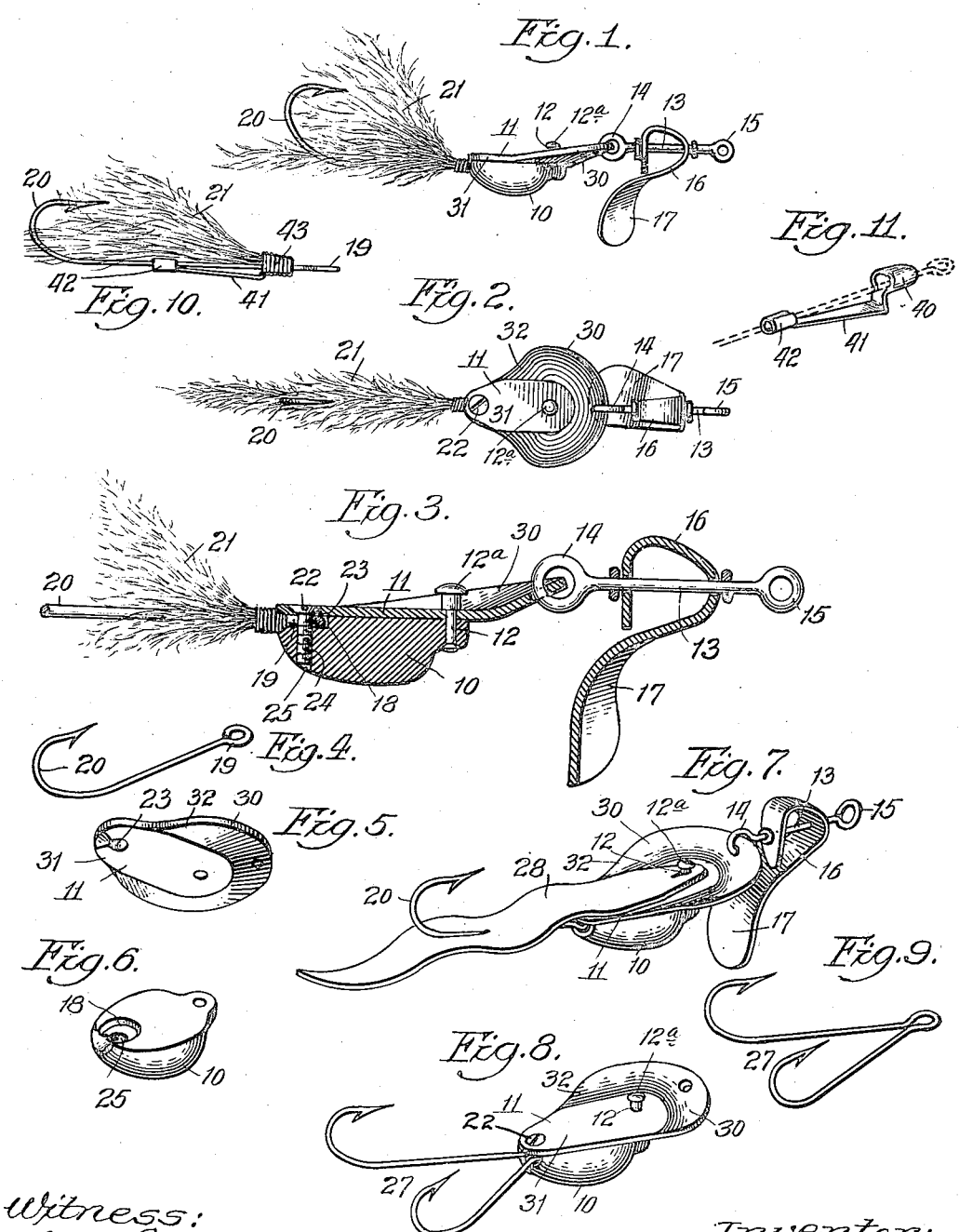

1,440,869

UNITED STATES PATENT OFFICE.

WILLIAM A. FOSS, OF CLEVELAND, OHIO.

ARTIFICIAL BAIT.

Application filed October 6, 1919. Serial No. 328,660.

*To all whom it may concern:*

Be it known that I, WILLIAM A. FOSS, a citizen of the United States, and a resident of Cleveland, in the county of Cuyahoga and State of Ohio, have invented certain new and useful Improvements in Artificial Bait, of which the following is a full, clear, and exact description.

The invention relates to artificial bait. In fishing, it is frequently desirable to use different sizes of hooks or hooks with different lures, such as feathers or pork-rind, on the same body. In practice, I have found that a hook that is rigidly secured to the body is much more effective in catching fish than when it is pivotally secured thereto and one object of the present invention is to provide an artificial bait-body with a readily detachable and rigidly secured hook so that the fisherman can, with great facility, rigidly apply hooks of different sizes or hooks with different lures or with or without lures to the body.

A further object of the invention is to provide an improved bait with a plate which tends to keep the bait on the surface of the water and which is shaped at its rear so that it will not interfere with the fish being caught on the hook when they strike.

The invention consists in the several novel features hereinafter set forth and more particularly defined by claims at the conclusion hereof.

In the drawings: Fig. 1 is a side elevation of a bait embodying the invention. Fig. 2 is a plan. Fig. 3 is a longitudinal section. Fig. 4 is a detail of the hook. Fig. 5 is a detail perspective of the plate attached to the body. Fig. 6 is a perspective of the body. Fig. 7 is a perspective showing a plain hook and pork-rind substituted for the hook and feather lure shown in Fig. 1. Fig. 8 is a perspective showing a double hook substituted for the single hook. Fig. 9 is a perspective of the double hook shown in Fig. 8. Fig. 10 is a detail of a removable hook with an improved lure-holding device. Fig. 11 is a detail perspective of said holding device.

The improved bait comprises a body 10 usually formed of metal or other suitable material in which a permanent screw-thread may be formed to the upper end of which a plate 11 is secured by a pin 12 which passes through the plate and body and forms a pivotal connection therebetween to permit relative pivotal movement so that the plate can be swung laterally to uncover the top of the body 10. A rod 13 has a rear eye 14 which is connected to the front of the plate 11 and a front eye 15 which is adapted to be connected to the fishing line. A spinner 16 is pivotally held on the rod 13 and is provided with a single blade 17 which is adapted to vibrate the rod 13.

A recess 18 is formed in the top of the body 10 and is adapted to receive the integral eye 19 of the fish-hook 20 which may, as shown in Fig. 1, be provided with a feather 21. A screw 22 has a head which is adapted to pass into a countersunk hole 23 in the plate 11 and a screw-threaded shank 24 which is adapted to enter a correspondingly threaded hole 25 in the body 10. The recess 18 is formed to confine the hook against lateral movement and the screw is adapted to clamp the plate 11 down onto the eye 19 of the hook so that the latter will be rigidly secured to the body. This screw can be readily removed to permit the plate 11 to be swung laterally relatively to the hook to release the eye 19 of the hook. This construction exemplifies a readily detachable connection between the hook and the body which permits the fisherman to change the hooks with facility at the same time rigidly securing the hooks to the body. For example, in fishing, it is sometimes desirable to change the size of the hook or to substitute, for the feathered hook shown in Fig. 1, a plain hook, as shown in Fig. 7, or to use a double hook 27, as shown in Figs. 8 and 9. The head 12ª of the pin 12 serves as a button for a flexible strip 28 of pork-rind or other suitable material.

From the foregoing, it will be seen that the invention provides artificial bait by which hooks may be readily and rigidly and interchangeably secured to the bait-body, so that the fisherman can readily substitute different hooks or lures.

The plate 11 is provided with a flared, round, front marginal portion 30 which is adapted to influence the bait to come to the surface of the water as the bait is being drawn through the water. The rear portion of this plate is flat and narrow, as at 31. The rear edges of the flared portion 30 are convergent, as at 32. An important advantage inherent in this construction is that when a fish strikes at the hook 20, the rear portion of the plate is so flat and narrow that it does not interfere with the fish being caught on the hook.

In Figs. 10 and 11, there is illustrated a bait in which an improved holding device is used to secure the feather or hair on the hook. This device is formed of a strip of metal bent to form members 40 which are adapted to extend around the shank of the hook and to secure the double or front ends of the feather or hair to the hook. A strip 41 underlying the hook and rear members 42 adapted to extend around the shank of the hook. Members 40 serve to hold the front ends of the feather or hook while they are being secured to the hook by a wrapping 43. The wrapping and holder are usually colored so as to form the attractive part of the lure.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a fishing device, the combination of a body, a plate pivotally connected to the body, a hook having an eye adapted to pass between the plate and the body, and a screw adapted to pass through the plate and eye into the body to interchangeably and rigidly secure the hook to the body.

2. In an artificial bait, the combination of a body forming a weight, a hook rigidly secured to the body and a plate having a flat portion extending longitudinally of and secured to the top of said body and having its front margin flared and its rear portion flared toward said body.

WILLIAM A. FOSS.